(12) United States Patent
Brunswig et al.

(10) Patent No.: US 7,487,512 B2
(45) Date of Patent: Feb. 3, 2009

(54) PUBLISH-SUBSCRIBE EVENT NOTIFICATIONS

(75) Inventors: Frank Brunswig, Heidelberg (DE); Timm Falter, Sinsheim (DE); Martin Hartig, Speyer (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 854 days.

(21) Appl. No.: 10/954,904

(22) Filed: Sep. 30, 2004

(65) Prior Publication Data

US 2006/0070083 A1    Mar. 30, 2006

(51) Int. Cl.
 G06F 3/00 (2006.01)
 G06F 9/44 (2006.01)
 G06F 9/46 (2006.01)
 G06F 13/00 (2006.01)

(52) U.S. Cl. ...................... 719/318; 719/316
(58) Field of Classification Search ......... 719/313–320, 719/328
See application file for complete search history.

(56) References Cited

U.S. PATENT DOCUMENTS

| | | | |
|---|---|---|---|
| 6,091,724 A | 7/2000 | Chandra et al. | |
| 6,405,191 B1 | 6/2002 | Bhatt et al. | |
| 6,728,715 B1 | 4/2004 | Astley et al. | |
| 6,772,350 B1 | 8/2004 | Belani et al. | |
| 6,779,184 B1 | 8/2004 | Puri et al. | |
| 6,782,541 B1 * | 8/2004 | Cohen et al. | 719/318 |
| 6,788,939 B2 | 9/2004 | Truong et al. | |
| 7,007,029 B1 * | 2/2006 | Chen | 707/100 |
| 7,177,859 B2 * | 2/2007 | Pather et al. | 707/3 |
| 2003/0014462 A1 * | 1/2003 | Bennett et al. | 709/100 |
| 2004/0181775 A1 * | 9/2004 | Anonsen et al. | 717/104 |
| 2006/0070083 A1 * | 3/2006 | Brunswig et al. | 719/318 |

* cited by examiner

Primary Examiner—Meng-Ai An
Assistant Examiner—Diem K Cao
(74) Attorney, Agent, or Firm—Finnegan, Henderson, Farabow, Garrett & Dunner, L.L.P.

(57) ABSTRACT

Methods and apparatus, including computer program products, for providing notifications of events include defining a set of standard events for objects in a back end system and operating on an object in the back end system using an instance of a service provider class. Conditions corresponding to a standard event from the set of standard events are detected. The conditions corresponding to the standard event are defined by meta data stored in a repository. One or more subscribers to the standard event are notified in response to a detected condition.

14 Claims, 6 Drawing Sheets

PUBLISH-SUBSCRIBE EVENT NOTIFICATIONS

BACKGROUND

The present invention relates to data processing by digital computer, and more particularly to publish-subscribe event notifications.

Large-scale business software applications are sometimes categorized in terms of a "front end component" that includes a graphical user interface (GUI) to present data to users and accept data entry from users. Such front end components are customized for specific customers. Another component of such software applications is sometimes referred to as a "back end component" that stores business data and processes the business data according to business logic. The back end component retrieves, generates, and maintains the business data. The back end component is usually responsible for the consistency and correctness of the data. The back end component also can store relationships between the various data. In a typical business software application, the front end component includes application code to display and aggregate data of the back end and provides help to generate requests to the back end for update operations.

The data of the back end can be represented using relational database terminology. In relational database terminology, an entity is a record and an entity type is a set of entities with common attributes to which a unique name and a unique description are assigned. Typically, a database has multiple two dimensional tables where each table represents an entity type and each row in each table represents an entity. An attribute is a description of a characteristic of an entity or entity type. Typically, an attribute is specified in a field or a column in a database table. Entity types can also have relationships that enable linking one or more entities of an entity type to other entities of another entity type. This linking can be done using foreign keys by having one or more fields in one table pointing to a primary key of a second table. This enables traversing from a set of entities in one table to related entities in another table.

Business software applications can support publish-subscribe mechanisms through which subscriber entities are informed of an occurrence of an event by publishing entities at which the event occurs. Typically, events are associated with a particular object in that the events are triggered or raised by that object. The object triggers a certain event when a predefined condition occurs. Upon triggering the certain event, the publishing object notifies an event subscriber of the event. Event subscribers can include other objects, process engines, or other entities.

SUMMARY OF THE INVENTION

The present invention provides methods and apparatus, including computer program products, that implement techniques for providing notifications of events in business software applications.

In one general aspect, the techniques feature defining a set of standard events for objects in a back end system and operating on an object in the back end system using an instance of a service provider class. Conditions corresponding to a standard event from the set of standard events are detected. The conditions corresponding to the standard event are defined by meta data stored in a repository. One or more subscribers to the standard event are notified in response to a detected condition.

The invention can be implemented to include one or more of the following advantageous features. Data identifying the one or more subscribers is stored in the repository, and the one or more subscribers are notified using the data stored in the repository. The set of standard events includes one or more of modifying a business object, inserting a business object, and/or deleting a business object. Each subscriber is a client. A list of standard events for which the corresponding conditions have been detected is maintained, and the list of standard events is processed in accordance with a predetermined algorithm. Data defining publishing constraints is stored in the repository, and the one or more subscribers are notified only if the publishing constraints are satisfied. Subscription information identifying subscribers based on one or more criteria is stored in the repository. The criteria includes a name of an event, a unique key for an object, and/or an object type, and the notification of the one or more subscribers is based on the subscription information.

In one general aspect, the techniques use a repository and an enterprise services framework. The repository includes meta data representing business objects in a back end system, definitions of conditions corresponding to events, and registrations of event subscribers and the enterprise service framework is in communication with the repository. The enterprise service framework is operable to detect an operation on a business object in the back end system by an instance of a service provider class; determine whether the operation satisfies the defined conditions in the repository corresponding to a particular event; trigger the particular event if the operation satisfies the defined conditions corresponding to the particular event; and notify one or more event subscribers registered to receive a notification of the particular event based on the registrations in the repository.

The invention can be implemented to include one or more of the following advantageous features. The enterprise service framework receives requests from clients and initiates operations by instances of service provider classes in response to the requests. The event subscribers are clients and/or instances of service provider classes. The conditions corresponding to events define standard events and the enterprise service framework is operable to receive notifications of custom events defined for a service provider class. The enterprise service framework is operable to maintain a list of events. Each event in the list includes attributes such as an event name, a unique key associated with the business object associated with the event, and/or an object type for the business object associated with the event. The enterprise service framework is further operable to process the list of events prior to notifying the one or more subscribers in accordance with predetermined rules stored in the repository. The registrations of event subscribers define event subscriptions based on attributes of the events.

The invention can be implemented to realize one or more of the following advantages. A service-oriented business framework can support standard events for all relevant interfaces. The standard events can be used by business objects and do not need to be independently defined for each business object. The framework can automatically trigger the events instead of including event triggering logic in individual service providers. The publication of events can be modeled at design time, and the processing behavior (e.g., synchronous/asynchronous) of event publications can be modeled and imposed by the framework. Accordingly, events can be collected and can be delivered to subscribers across environment boundaries (e.g., Java, ABAP, .NET) and/or network boundaries. Use of the service-oriented business framework to support standard events decouples subscribers from publishers. Subscribers can subscribe to events based, at least in part, on the event name, the type of object that triggered the event, or a unique key that identifies the particular object that triggered the event. The service-oriented business framework can also provide runtime monitoring of event dispatching and processing. Support of standard events in the framework avoids interface problems because the events do not transport business object data; instead, subscribers use the framework access methods for accessing the data of the publisher. Subscriptions also do not cause runtime delays in the publishers caused by delayed or asynchronous processing by the subscribers. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
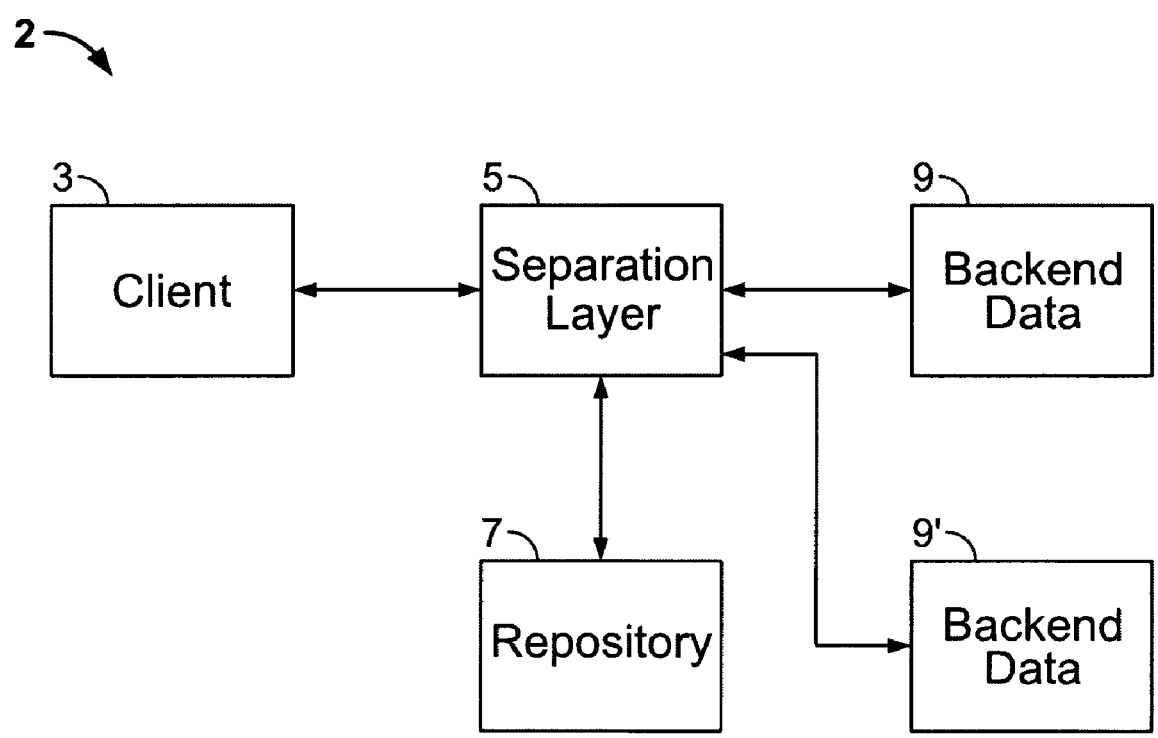
FIG. 1 is a block diagram of an example logical representation of a business software application.

FIG. 1 illustrates an overview logical representation of a business software architecture 2, which includes a client 3, a separation layer 5, a repository 7 and backend data 9 and 9'. Client 3 provides a user interface (UI) that enables a user to interact with the backend data 9 and/or 9'. Backend data 9 and 9' can be associated with different backend applications and/or can be arranged and formatted differently from each other. Separation layer 5 separates the front end user interface provided by client 3 from the back end data 9 and 9'. This separation enables client 3 to interact with backend data 9 and 9' in a consistent and similar manner, regardless of the formatting or application-associated differences between backend data 9 and 9'. In other words, separation layer 5 provides a canonical interface to backend data 9 and 9' so that client 3 is configured to interact with separation layer 5 and only needs to be updated if separation layer 5 changes. Changes to backend data 9 and 9' do not necessitate an update to client 3. Further, separation layer 5 is scalable and configured to handle changes and growth to backend data 9 and 9' and any other disparate backend data and backend services that are further connected to separation layer 5.

As described in more detail below, separation layer 5 is based on a meta model that defines how backend data (e.g., 9 and 9') are represented in separation layer 5. Meta data is stored in repository 7 that describes how the backend data 9 and 9' fit into the meta model representation. Client 3 interacts with backend data 9 and 9' using a generic command set defined by separation layer 5. As described in more detail below, separation layer 5 accesses service providers that perform the generic commands from client 3, using the meta data in repository 7, to effect the requested manipulation of backend data 9 and 9'. The service providers are configurable so that different service providers can be used for different backend data 9 and 9'. Separation layer 5 includes an interface (e.g., a service manager) that hides the characteristics of the corresponding backend data 9 and 9' and also the granularity and distribution of the implementation (i.e., the service providers).

Separation layer 5 also defines a set of standard events for objects in backend data 9 and 9'. Separation layer 5 automatically triggers the standard events when predefined conditions occur. Thus, the service providers do not need to detect the conditions and trigger the events.

Figure 2:
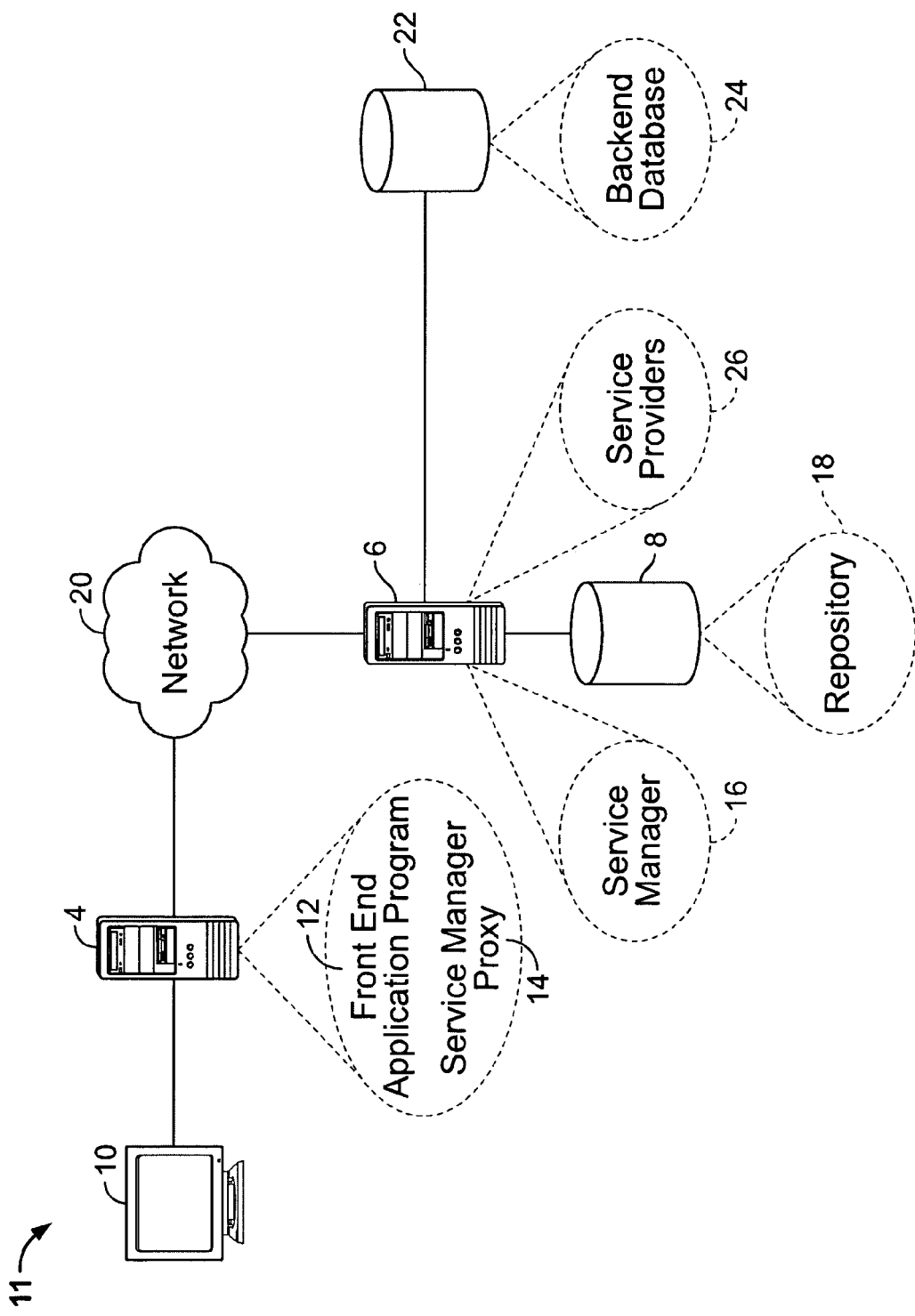
FIG. 2 is a view of a network configuration for a business software application.

FIG. 2 illustrates an example implementation of the business software architecture 11. As shown in FIG. 2, the business software architecture 11 includes a first computer 4 and a second computer 6. The computers 4 and 6 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 4 and 6 can be preprogrammed, in ROM, for example, or the computers 4, 6 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 20 connects computers 4 and 6. The network 20 is any form or medium of digital data communication, e.g., a communication network. Examples of communication network 20 include a local area network ("LAN") and a wide area network ("WAN"), e.g., the Internet.

Computer 4 executes instructions of a front end application program 12. Application program 12 represents a front end component of the business software architecture 11. Service manager 16, running on computer 6, is a service layer between the front end application program 12 and a set of back end service providers 26. Service manager 16 provides a service interface to front end application program 12 to enable indirect interaction with the set of back end service providers 26 running on computer 6. This service interface allows for a partial separation of software development for front end application program 12 and the set of back end service providers 26.

Computer 6 includes a data storage device 22 that stores a back end database 24 containing data that can be used by the set of back end service providers 26. Computer 6 also includes a data storage device 8 containing an information repository 18 that defines and describes the services provided by the set of back end service providers 26. The meta data in repository 18 is organized according to a meta model.

In general, a meta model is a collection of "concepts" that are the vocabulary with which a certain domain can be described. Meta models typically are built according to a strict rule set, which in most cases is derived from entity-relationship-attribute or object-oriented modeling. The front end application program 12 can access (and interpret according to the strict rule set) the contents of repository 18 via the service manager 16. These services support the functionality of application program 12 and include retrieving and reading data in addition to modifying stored data. The service providers 26 can access or modify stored data in backend database 24 to provide services to front end application program 12. To provide the services, the set of back end service providers 26, upon request from the front end application program 12, either access or modify stored data in backend database 24 or calculate new data.

The repository 18 defines a syntax for requesting services provided by the set of back end service providers 26 and semantically describes the services. As front end application program 12 executes, front end application program 12 can use this syntax and semantic description from the repository 18 (accessed through the service manager 16) to determine what services front end application program 12 can use to meet its requirements. This syntax and semantic description for stored or computed backend data can be referred to as "meta data". This stored or computed backend data is conceptually organized using object-oriented terminology in terms of business objects, where each business object is an instance of a class or data entity type. In one example, a class of business objects refers to a relational database table where each row of data in the table represents the data for a particular business object. In this example, each field in the table represents an attribute of the business object class. In another example, there is a class of business objects that partially refers to a relational database table such that some of the fields in the table represent attributes of the business object class and other fields are computed upon request.

In the business software architecture 11, services provided to front end application program 12 are focused on data (i.e., data-centric) so the description of these services in repository 18 is also data-centric. Thus, the meta data in repository 18 is structured around representations of classes of these business objects. This meta data includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of backend service providers 26 on instances of these aspects.

Classifications of data, relations between data classes, pre-built queries for accessing data, and other descriptions of data provided by the set of backend service providers 26 are represented by repository 18. This representation, or meta data, of data (e.g., stored in backend database 24) provided by the set of backend service providers 26 describes different abstract types or classes of data in backend database 24 and how different data classes relate to each other. Objects are instances of these different abstract types. Meta data is information about data rather than content of the data. The meta data also defines a set of pre-built queries that can be executed on the data in database 24.

The semantic description in repository 18 can enable front end application program 12 to determine which services to request from service manager 16. These services often take the form of requesting data to display. Front end application program 12 reads the meta data in repository 18 and can flexibly request data organized in different ways that are specified by the meta data. For example, two service managers 16 with two different repositories 18 handle services that determine prices of books for companies A and B. For A and B, book prices are represented by different aspects with different data fields. Front end application program 12 reads A's repository 18 to obtain descriptions of data (including a price) concerning a particular book from A's service providers 26. Front end application program 12 reads B's repository 18 to obtain descriptions of data (including a price) concerning a particular book from B's service providers 26. Front end application program 12 is able to request and display the information from A's service provider 26 and the information organized differently from B's service provider 26 to present the book price information to a user.

For requesting the services described by the semantic description in repository 18, service manager 16 provides a canonical interface for services on the business objects in the backend. This canonical interface includes a set of standard operations on the business objects. Such standard operations on the business objects include select, insert, update, delete, select by relation, and update fields. These standard operations are intended to be easy to understand and use. The usage of these standard operations is understood through the strict rule set of the meta model of the repository 18. Furthermore, the repository 18 also includes documented modeling of the side effects of the usage of the operations. The side effects for an operation model which stored business objects are affected by executing the method. For example, "delete" usually has a side effect on other stored business objects related to the deleted object. Other standard operations perform more specialized tasks and support functionality for transactions between front end application program, 12 and service manager 16 (e.g., a lock operation).

The side effects of the usage of the operations can be handled through a publish-subscribe function of the service manager 16. The repository 18 defines a set of standard events that are included for (or useable by) stored business objects. Thus, the standard events do not need to be independently defined for each business object. The standard events include, for example, insert, update, and delete operations. Other business objects, service providers 26, or processes can subscribe to the standard events, and subscription data identifying the subscribers and the types of events to which the subscribers subscribe is stored in the repository 18. For example, service providers 26 associated with business objects other than the publisher business object may rely upon data stored in the publisher business object. These other business objects may, therefore, need to be informed when the publisher business object changes and can do so by becoming a subscriber. In some cases, some follow-up processing needs to be performed on the changed business object itself, such as updating statistics in a business warehouse or triggering a message flow in a business enterprise infrastructure. Client-side subscriptions can be used to inform the front end application program 12 of a business object change for purposes of publishing data to the client to update a user interface or for use by the client to determine if the change necessitates a refresh of information associated with other business objects.

When a publisher (e.g., a service provider 26) performs an operation corresponding to a standard event, the service manager 16, based on the subscription data stored in the repository 18 triggers the standard event and notifies all of the subscribers for the standard event. For example, a content management repository manager or other high level framework can subscribe to an update event for a defined set of business objects to be notified when any of those business objects are changed. Accordingly, the service manager 16 provides a generic publish/subscribe event notification infrastructure for scenarios described by state transitions of business objects.

In addition to the standard events, custom or specialized events can also be defined for business objects, triggered, and subscribed to by other entities, but the custom events need to be explicitly defined by the front end application program 12 or the individual service providers 26. In addition, the front end application program 12 or the individual service providers 26 also need to provide the functionality for triggering the custom events. In some implementations, the service manager 16, in conjunction with the repository 18, can support a generic business event notification service that receives an identification of an event from a service provider 26 and handles the process of notifying subscribers, which are identified by data in the repository 18. Use of the business event notification service can help ensure that the event is triggered only once and the event subscribers are called only once. In addition, the service can be used to ensure that the subscribers are notified only "on commit." In other words, the subscribers are only notified if the operation is fully performed. For example, changing a business object's content and discarding the change does not result in a notification of subscribers.

The canonical interface provided by the service manager 16 also includes specialized actions that are defined for specific classes of business objects and queries that can be defined for clusters of classes of business objects. The clusters are modeled as service modules in the meta data. These actions and queries are also defined in the meta data of the repository 18.

During execution, front end application program 12 issues service requests to service manager 16, service manager 16 checks the requests for consistency with the meta data in repository 18, and then the service manager 16 passes the requests to back end service providers 26 according to the meta data in the repository database 18. The manner of implementing the set of back end service providers 26 and data in database 24 is independent of application 12, with back end service providers 26 and data in database 24 conforming to the definitions and descriptions of the meta data in the repository 18. Database 24 can be a relational database. However, database 24 can be modified to use a different mode of data organization other than a relational database and front end application program 12 does not need to be modified if back end service providers 26 and data in database 24 still conform to the meta data in the repository 18. One such different mode of data organization for database 24 can be an object-oriented database.

Front end application program 12 provides user interfaces displayed on monitor 10. Front end application program 12 provides application code to display and aggregate the data received from the set of backend service providers 26. Front end application program 12 generates requests, via service manager 16, to the set of backend service providers 26 for standard operations such as select, insert, update, delete, and execute in addition to more specialized operations. Front end application program 12 is interaction-centric, focused on aggregating data of the back end service providers 26 and combining interactive steps into a flow of screens and syndicated screen elements.

Front end application program 12 contains screen-flow logic of User Interface (UI) oriented applications and front end application program 12 binds a UI to the meta data in repository 18. Front end application program 12 can be indirectly bound to a specific set of backend services by back end service providers 26 via descriptions of the services in the metadata of the repository 18. Front end application program 12 can also be formed from various generic interaction-centric front-end layers that are only bound by configuration to a highly standardized service layer by service manager 16 serving as an intermediary to back end service providers 26.

In some implementations, a service manager proxy 14 gives the front end application program 12 a buffered access to a service interface provided by service manager 16. Service manager proxy 14 is a server on computer 4 that acts as an intermediary between the front end application program 12 and the service manager 16 so that the business software architecture 11 can ensure security, administrative control, and caching service.

Figure 3:
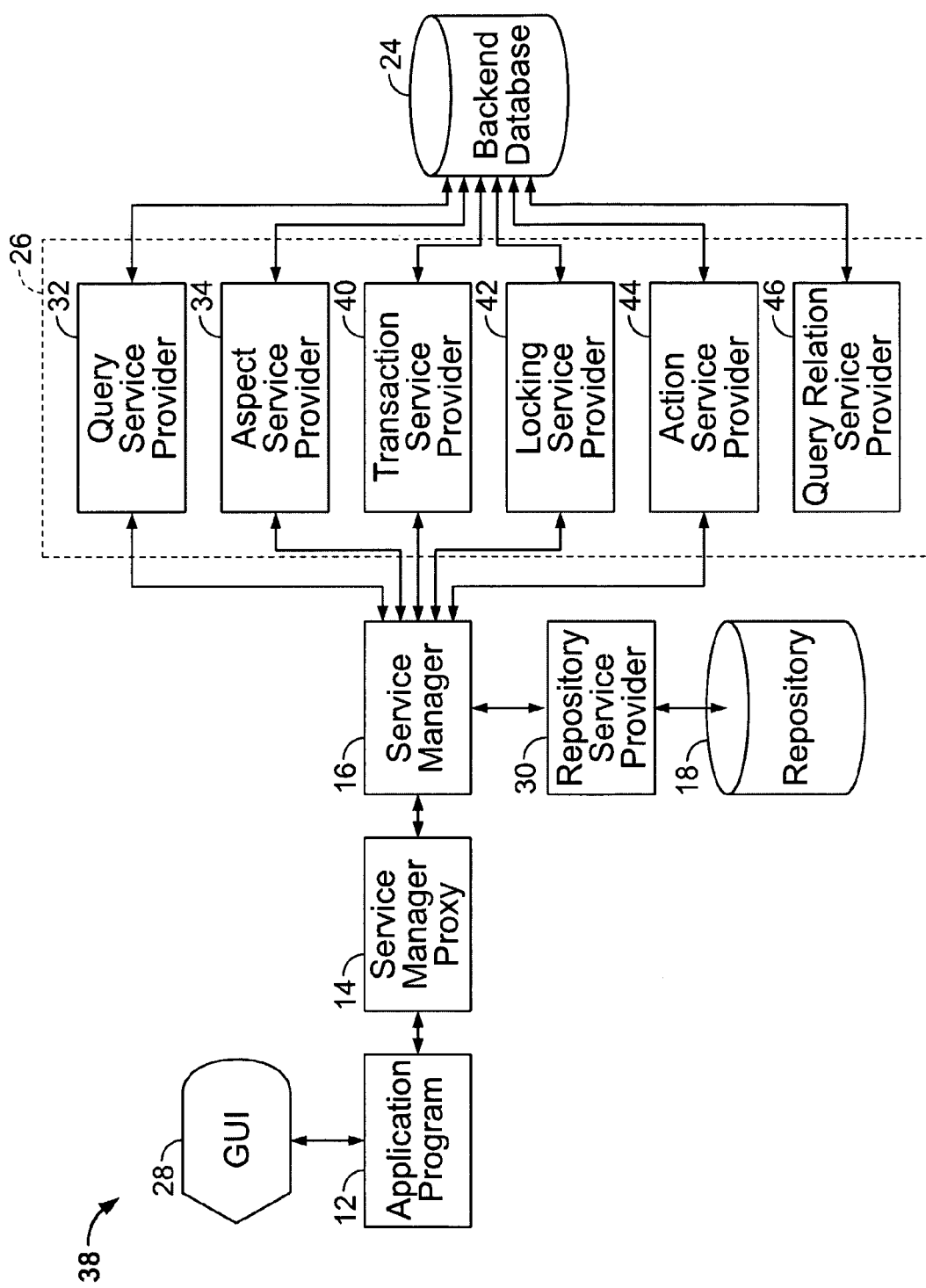
FIG. 3 is a block diagram of the business software application of FIG. 1.

As shown in FIG. 3, the service manager 16 provides an interface (defined by the meta data in repository 18) to front end application program 12 that hides the characteristics of the corresponding back end service providers from the set of backend service providers 26 and data in database 24. Front end application 12 uses this interface to retrieve data from backend database 24 to display in graphical user interface (GUI) 28 for interaction with a user.

The service manager 16 provides the interface to front end application program 12 by receiving and executing requests from front end application program 12 to backend service providers 26. After each receipt of a request by the service manager 16, the service manager 16 delegates the request to one or more service providers 30, 32, 34, 40, 42, 44, and 46. Service provider 30 is an instance of a software class repository service provider. Service providers 32, 34, 40, 42, 44, and 46 represent instances of software classes such as query service provider class (32), aspect service provider class (34), transaction service provider class (40), locking service provider class (42), action service provider class (44), and query relation service provider class (46). The software classes for service providers 32, 34, 40, 42, 44, and 46 can be implemented as ABAP global classes maintained by the ABAP class library using the ABAP development environment available from SAP of Walldorf (Baden), Germany. They also can be implemented by any other programming language on any other platform, e.g., Java on Linux or C# on Windows.

Repository service provider 30 handles requests to get or modify meta data from repository 18. Query service provider 32 handles queries on data in backend database 24 from front end application program 12. Aspect service provider 34 handles accessing and modifying data, navigation through relations, and calling actions. The aspect service provider 34 has a standard set of methods that correspond to the standard operations on aspects that can be requested from the service manager 16. These standard operations include select, insert, update, delete, select by relation, and update fields. Transaction service provider 40 allows business logic to act on different states of a transaction between front end application program 12 and service providers 26. Locking service provider 42 enables separation of concurrent accesses on data types in backend database 24. Action service provider 44 enables execution of actions on aspects. Query relation service provider 46 is the interface for the target aspect of a relation. In some examples, service manager 16 can have multiple different instances of service providers 32, 34, 40, 42, 44, and 46 for different elements in repository 18 representing services. Upon receiving a request for a service represented by an element in repository 18, the service manager 16 can look up a name of a service provider (e.g., 32, 34, 40, 42, 44, and 46) in the meta data for the element in repository 18. For example, the meta data describing an aspect in repository 18 defines which aspect service provider 34 is designed to handle services for the aspect. The service manager 16 uses this information in the meta data to direct requests from the front end application program 12 to the appropriate aspect service provider 34. Similarly, the meta data describing a query in repository 18 defines which query service provider 32 is designed to handle services for the query.

The interface provided by the service manager 16 provides requests or commands to front end application program 12. As mentioned previously, standard commands select, insert, update, delete, select by relation, and update fields are standard operations on aspects in the repository 18. These standard operations are provided by aspect service provider 34 and correspond to some of the requests or commands available to front end application program 12. A "Select" command provides a capability such that if the identifiers (or keys) of instances of a data type (e.g., stored in database 24) provided by aspect service provider 34 are known, front end application program 12 can select and read the attributes of these instances. An "Insert" command allows front end application program 12 to add new instances of a data type (e.g., stored in database 24) provided by aspect service provider 34. A "Select By Relation" command provides a capability that if a data type is known, front end application program 12 can find other data types that have relations to this data type as defined in repository 18. An "Update" command provides a capability to modify instances of data types (e.g., stored in backend database 24) provided by aspect service provider 34. A "Delete" command provides the capability to delete one or more selected instances of one or more data types (e.g., stored in backend database 24) provided by aspect service provider 34.

For at least some of the standard operations, corresponding standard events can be automatically triggered by the service manager 16 when the standard operations are performed. For example, the event "OBJECT_INSERTED" is triggered when a business object or an instance of a data type is newly created, the event "OBJECT_UPDATED" is triggered when a business object or an instance of a data type is modified, and the event "OBJECT_DELETED" is triggered when a business object or an instance of a data type is deleted. The semantic description of these standard events is stored in the meta data of the repository 18 and includes an event name. When an event is triggered, the event notification transports the event name, the business object type for the particular business object that triggered the event, and a unique key associated with the business object that triggered the event. The service manager 16 triggers the standard events without adapting the service providers (i.e., without changing the software code that defines the service providers) or the business objects themselves.

Figure 4:
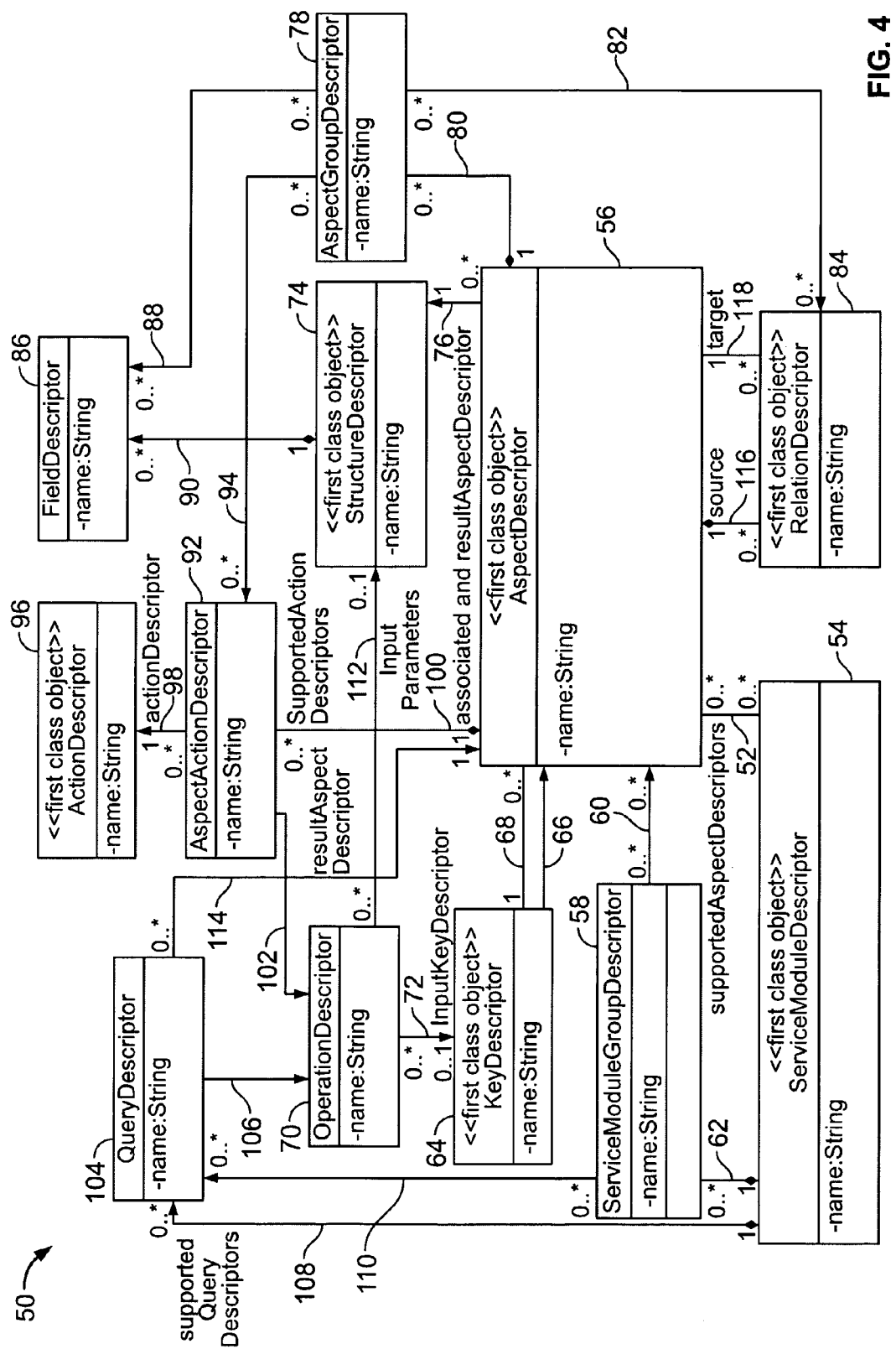
FIG. 4 is a Unified Modeling Language (UML) representation of a structure of a meta model repository.

The meta data in repository 18 is classified into data types or classes. The names of meta model classes representing the data type classifications in repository 18 have the suffix "descriptor" to express their belonging to the meta model and to differentiate them from runtime classes used by service manager 16. Descriptors of classes of the meta data of the repository 18 and their class relations are illustrated using an Unified Modeling Language (UML) class diagram 50 in FIG. 4.

Comparing the meta data to data described by relational database terminology, an aspect in the repository 18 can represent a class or an entity type fully or partially stored in backend database 24 and an aspect descriptor 56 includes attributes for the entity type in addition to other information about the entity type. The meta data in the repository 18 also can include relations descriptors 84 defining relations between aspects that can be implemented in database 24 as relationships using foreign keys in relational databases. The meta data also can include service modules descriptors 54 representing service modules that are aggregations of aspects and have predefined queries for accessing data in database 24.

The service modules defined in repository 18 are the building blocks for a set of applications (e.g., front end application program 12) in business software architecture 11 for a particular application area or industry. The service modules encapsulate the implementation and business logic and provide access to data and functionality in a unified canonical way. Examples for service modules in repository 18 are "business partner", "employee", "sales order", or "business activity". Service module descriptor 54 describe services modules in the data model of the meta data of the repository 18 and how the service modules can be accessed by queries from application program 12.

In repository 18, each defined query is an entry point to search instances of a data type (represented by an aspect) provided by service providers 26 via service manager 16. A "key" is an identifier of an instance of a data type provided by service providers 26. An "action" is a specialized method on one or more instances of an aspect. A "structure" is the aggregation of attributes representing the data of an aspect. A "relation" is the relation between objects of a source and a target aspect. A service module group is associated with a service module and is an aggregation of aspects, relations, and queries. An aspect group is associated with an aspect and is an aggregation of relations, aspect actions, and field descriptors 86. The meta data in the repository 18 also includes a text description of each aspect, query, key, action, structure, relation, service module group, and aspect group that is included in the available back end (e.g., backend database 24). So, the organization of the meta data in the repository 18 can be described in terms of those data types (e.g., aspect, query, key, action, structure, relation, service module group, and aspect group).

The data model for attributes of aspects, queries, keys, and actions is based on structure descriptors 74. In one example, every aspect has one structure descriptor 74 that defines the data attributes of the aspect. Structure descriptors 74 refer to a data dictionary in repository 18. A data dictionary is a collection of descriptions of the data objects or items in a data model for the benefit of programmers and others who need to refer to them. The structure descriptors 74 can be defined in an XML Schema or in one or more database tables in repository 18.

In one example, structure descriptors 74 defined in repository 18 include flat structures in database tables. A flat structure is a sequence of pairs of attribute names and field descriptors 86 of simple value types such as real, integer, character string, and Boolean. For instance, a structure descriptor 74 defining a two dimensional point can be a list {X, real, Y, real}, where X and Y are attribute names having real values.

In another example of the repository 18, structure descriptors 74 can include nesting and collections of other structure descriptors 74. Nesting of other structure descriptors 74, or sub-structures, to enable the generation of larger aspects is useful whenever the use of keys for sub-structures, defining smaller aspects does not make sense.

For front end application program 12 to access data (e.g., data stored in backend database 24) from service providers 26 through the service manager 16, instances of business object classes are identified by unique keys within a service module, for example the number of an order or the id of a product. To differentiate between different types of keys for different aspects in a service module, key descriptors 64 define different types of keys. A key descriptor 64 is associated with a structure descriptor 74 that can include more than one data attribute. In one example, every key has a character string attribute. A service module can be associated with different key descriptors 64 for different aspects, e.g., an order key may have another key descriptor 64 as an order item key.

Service module descriptor 54 includes a collection of aspect descriptors 56. An aspect descriptor 56 refers to one structure descriptor 74 and one key descriptor 64. The structure descriptor 74 includes all key attributes of the corresponding key descriptor 64. Key descriptors 64 are specialized aspect descriptors 56. The key descriptor 64 attribute of a key refers to itself as a self-reference. Examples for aspect descriptors 56 within a simple sales order service module can include: Order, Order Detail, Shipping Address, Billing Address, and Order Item as well as descriptors for key aspects like Order ID and Order Item Key. Service module descriptor 54 specifies the collection of supported aspect descriptors 56. Multiple service module descriptors 54 can be associated with the same aspect descriptor 56.

Aspect descriptors 56 relate to each other specified by relation descriptors 84. A relation descriptor 84 has one source aspect descriptor 56 and one target aspect descriptor 56. In this sense, relation descriptors 84 are directed. Relation descriptors 84 also have an optional cardinality (e.g., 1 . . . n) and a category. Supported categories are, for example, Parent-Child or Child-Parent.

A relation descriptor 84 defining a relation between source aspect A and target aspect B means that it is possible to traverse from instances of aspect A to instances of aspect B. For example, given that aspects A and B are implemented in backend database 24 as relational database tables, this means that one or more fields in a table corresponding to aspect A point to the primary key of a table corresponding to aspect B. The relation descriptor 84 defining a Parent-Child relation from source aspect A and target aspect B means that aspect B depends on the existence of aspect A. For example, given that aspects A and B are implemented in backend database 24 as relational database tables, this means that a primary key of a table corresponding to aspect B is derived from a table corresponding to aspect A. Relation descriptors 84 are introduced to describe internal navigation from one aspect to another within the same service module, e.g., from an order to the shipping address (cardinality 1 . . . 1) or to the order items (cardinality 1 . . . n) within a sales order service module. Relation descriptors 84 are independent of service modules and can be reused by different service modules. For an internal navigation or traversal from one data type to another in backend database 24, the visible (usable) relation descriptors of a source aspect descriptor 56 are defined by the service module descriptor 54, which has a list of supported relation descriptors 84. Navigation is allowed for those supported relation descriptors 84 that have a target aspect descriptor 56 that is also supported by the service module descriptor 54.

Operations for accessing and acting on data types in backend database 24 are described in operation descriptors 70. The structure descriptor 74 defines input parameters of the operation descriptor 70. This structure descriptor 70 also includes an input key descriptor 64 that enables mass and filter operations. Mass operations are operations specified by front end application program 12 on multiple instances of a data type in backend database 24. Filter operations filter the results of an operations, e.g., a query, by the keys defined by the input key descriptor. Input parameters for operation descriptors 70 are optional.

There are three types of operation descriptors 70 i.e., query descriptors 104, aspect action descriptors 92, and action descriptors 96. The aforementioned commands Query and Execute action are defined by operation descriptors 70.

Query descriptors 104 describe query methods that allow searching for instances of aspects within a service module. The query descriptor 104 includes an input parameter, an input key descriptor 64, and a result aspect descriptor 56. The input parameter is a structure descriptor 74 that defines the search parameter structure of the query. The input key descriptor 64 defines which keys may be used for filtering. For example, executing a query defined by a query descriptor 104 with filtering keys results in a list of keys meeting the criteria of the first input. This list of keys is filtered by the set of filtering keys of the input key descriptor 64 so that a subset of the list of keys can be returned. The result aspect descriptor 56 for the query descriptor 104 specifies the type of result of the query, which could be any aspect descriptor 56 that is associated with the service module.

Each service module descriptor 54 has a set of supported query descriptors 104. Service module descriptors 54 cannot use query descriptors 104 defined in other service module descriptors 54 since the query descriptor 104 belongs to one service module descriptor 54.

Aspects provide additional operations (beyond the standard operations select, insert, update, delete, select by relation, and update fields) in the form of actions, which are described by aspect action descriptors 92. Aspect action descriptors 92 are specialized operation descriptors 70 on aspects. The aspect descriptor 56 can have a set of supported aspect action descriptors 92. The input parameter for an aspect descriptor 96 defines the parameter structure of the action. The input key descriptor 64 specifies which keys may be used for mass operations, e.g., an email action may have as input a list of keys representing multiple emails.

Action descriptors 96 can define actions for multiple actions like Print, Email, Fax, Approve, Clear, Cut, Copy, Paste and Cancel. But there also may be more aspect specific actions that can be only used for one or a few aspects. Action descriptors 96 are introduced to enforce reuse. Each aspect action descriptor 92 is associated with an action descriptor 96, where the name and the meaning (textual description) are defined.

Action descriptors 96 specify a name and the meaning (textual description) of the action. They do not specify parameters and are not used to describe polymorphic behavior of operations. They can be used for taxonomies.

A service module group descriptor 58 can be associated with aspect descriptors 56, relation descriptors 84, and query descriptors 104. An aspect group descriptor 78 can be associated with relation descriptors 84, aspect action descriptors 92, and field descriptors 86.

The diagram 50 includes a zero or more to zero or more relationship 52 between service module descriptor 54 and aspect descriptor 56, since multiple instances of aspects can be associated with multiple instances of service modules. Service module group descriptor 58 has a zero or more to zero or more directed relation 60 towards aspect descriptor 56 since aspects can be grouped together in a service module group. Service module group descriptor 58 also has a zero or more to one composite aggregation relationship 62 with service module descriptor 54 because service module groups can be aggregated together in a service module. Key descriptor 64, as a specialization of aspect descriptor 56, has an inheritance relationship 66 with aspect descriptor 56. Key descriptor 64 also has a one to zero or more relationship 68 with aspect descriptor 56, since each aspect has a key associated with that aspect to uniquely identify instances of the aspect. Operation descriptor 70 has a directed zero or more to zero or more relationship 72 with key descriptor 64, since operations can include input keys. Aspect descriptor 56 has a zero or more to one relationship 76 with structure descriptor 74 since each aspect descriptor 56 can have a structure descriptor 74 defining its attributes. Aspect group descriptor 78 has a zero or more to one composite aggregation relationship 80 with aspect descriptor 56 since an aspect can be an aggregation of aspect groups. Aspect group descriptor 78 also has a directed zero or more to zero or more relationship 82 with relation descriptor 84 since aspect groups also include relations. Structure descriptor 74 has a one to zero or more ownership relationship 90 with field descriptor 86 since a structure can use many data fields to define itself. Aspect group descriptor 78 also has a zero or more to zero or more relationship 88 with field descriptor 86.

Aspect action descriptor 92 has a zero or more to one aggregation relationship 100 with aspect descriptor 56 since aspects can provide actions that can be executed on the aspect. Aspect action descriptor 92 has an inheritance relationship 102 with its superior class operation descriptor 70. Query descriptor 104 also has an inheritance relationship 106 with its superior class operation descriptor 70. Service module descriptor 54 has a one to zero or more relationship 108 with query descriptor 104 since a service module can include zero or more queries. Service module group descriptor 58 has a zero or more to zero or more directed relationship 110 with query descriptor 104 since queries can also be grouped together in a service module group.

Operation descriptor 70 has a zero or more to zero or one relationship 112 with structure descriptor 74 since each operation includes input parameters in the form of structures. Query descriptor 104 has a zero or more to zero or one relationship 114 with aspect descriptor 56 since queries include a resulting aspect. Relation descriptor 84 has zero or more to one relationships 116 and 118 with aspect descriptor 56 since relations have source and target aspects.

These descriptors define an organization of the meta data in repository 18. The organization of the meta data can use a fixed set of relational database tables, although other persistence mechanisms (e.g., XML) can also be used. Relational database tables used in connection with a publish-subscribe functionality are defined in Tables 1-5, where each row of Tables 1-5 defines a field or column of the relational database tables. The main data type of repository 18 is the aspect. The database tables for describing an aspect are Table 1, SCOL_ASPECT, and Table 2, SCOL_ASP_ACTION. Table 1 includes descriptions of properties of an aspect. The key field for Table 1, SCOL_ASPECT, is the ASPECT_NAME field because an aspect's name is unique for an aspect. The ASPECT_CATEGORY field indicates if the aspect represents a non-key aspect or a key aspect. The STRUCTURE field indicates a data structure name for data attributes of the aspect. A key is associated with an aspect by putting the key's name in the KEY_ASPECT field. The SERVICE_PROVIDER field defines the aspect service provider 34 for an aspect. The TRANSAC_PROVIDER field defines the transaction service provider 40 for an aspect. The LOCKING_PROVIDER field defines the locking service provider 42 for an aspect. The repository 18 can also have a corresponding table for the description of an aspect.

TABLE 1

SCOL_ASPECT definition

| Field Name | Key | Description |
| --- | --- | --- |
| ASPECT_NAME | X | Name of the aspect |
| ASPECT_CATEGORY | | Aspect type: aspect or key aspect |
| STRUCTURE | | The corresponding data structure of the aspect |
| KEY_ASPECT | | The corresponding key aspect |
| SERVICE_PROVIDER | | The name of the corresponding aspect service provider class |

TABLE 1-continued

SCOL_ASPECT definition

| Field Name | Key | Description |
| --- | --- | --- |
| TRANSAC_PROVIDER | | The name of the corresponding transaction provider class |
| LOCKING_PROVIDER | | The name of the corresponding locking provider class |

Aspects can provide actions that can be executed on the aspect. Descriptions of the actions are stored in Table 2, SCOL_ASP_ACTION. The actions are uniquely denoted by the aspect name and the name of the action so ASPECT_NAME and ACTION_NAME fields are key fields for SCOL_ASP_ACTION table. The field PARAM_STRUCTURE refers to a data structure that holds input data parameters for the action. The field INPUT_KEY_ASPECT refers to the name of a key aspect that defines the type of keys used to designate which instances of data types in repository 18 are acted upon by the action. The field PROVIDER_CLASS refers to the name of the action service provider class providing the action from the service provider implementing the aspect named in ASPECT_NAME field.

TABLE 2

SCOL_ASP_ACTION definition

| Field Name | Key | Description |
| --- | --- | --- |
| ASPECT_NAME | X | Name of the aspect |
| ACTION_NAME | X | Name of the Action |
| PARAM_STRUCTURE | | The corresponding data structure of the input parameters |
| INPUT_KEY_ASPECT | | The name of the key aspect of the input aspects |
| PROVIDER_CLASS | | The name of the action service provider class |

The properties of a service module are stored in the Table 3, SCOL_SVC_MODULE. Each Service module is uniquely described by its name so SVC_MODULE_NAME field is the key field for a SCOL_SVC_MODULE table. For each service module, the field TRANSAC_PROVIDER specifies the name of the transaction provider 40 for the service module. The repository 18 also has a corresponding table for the description of a service module.

TABLE 3

SCOL_SVC_MODULE definition

| Field Name | Key | Description |
| --- | --- | --- |
| SVC_MODULE_NAME | X | Name of the service module |
| TRANSAC_PROVIDER | | The name of the corresponding transaction service provider class |

Every service module is associated with aspects that can be used within the service module. Names of the aspects that can be used within each service module are stored in the Table 4, SCOL_ASPECT_USE. Since each aspect-service module usage is uniquely described by a name of a service module and the name of an aspect, the fields SVC_MODULE_NAME and ASPECT_NAME are the keys for SCOL_ASPECT_USE table.

TABLE 4

SCOL_ASPECT_USE definition

| Field Name | Key | Description |
| --- | --- | --- |
| SVC_MODULE_NAME | X | Name of the service module |
| ASPECT_NAME | X | Name of the aspect |

Service Modules can provide queries to retrieve data. Descriptions of the queries of a service module are stored in the table SCOL_QUERY illustrated in Table 5 below. The structure of the database table is defined in Table 6. Since each query is uniquely defined by a service module and a query name, the fields SVC_MODULE_NAME and QUERY_NAME are key fields for SCOL_QUERY table. Other fields include RESULT_ASPECT that specifies the name of an aspect defining the data type returned by the query and PARAM_STRUCTURE that specifies a data structure containing the input parameters for the query. For example, a query done on a particular aspect (e.g., specified in field RESULT_ASPECT) associated with the service module can include input parameters that are matched with attributes of instances of the particular aspect and the matching instances are returned as a dataset of keys referring to those instances. The field INPUT_KEY_ASPECT is used to define the key aspect describing keys that could be used as filters for the query. The PROVIDER_CLASS specifies the name of the query service provider 32 associated with each query. The repository 18 also has a corresponding table for the description of a query.

TABLE 5

SCOL_QUERY definition

| Field Name | Key | Description |
| --- | --- | --- |
| SVC_MODULE_NAME | X | Name of the service module |
| QUERY_NAME | X | Name of the query |
| RESULT_ASPECT | | Name of the result aspect of the query |
| PARAM_STRUCTURE | | The corresponding data structure of the input parameters |
| INPUT_KEY_ASPECT | | The name of the key aspect of the input aspects |
| PROVIDER_CLASS | | The name of the corresponding query provider class |

As stated previously, architecture 38 includes six service provider classes (i.e., transaction 40, query 32, aspect 34, action 44, query relation 46, and locking 42) for handling requests from front end application program 12, other than requesting meta data from repository 18, which is handled by repository service provider class 30. To provide services upon request by front end application program 12, service manager 16 directly calls instances of service provider classes. These instances of service provider classes can be located on the same computer (e.g., 6) as service manager 16 or on a different computer.

The locking service provider 42 can be used to implement a generic lock manager for a single aspect or a set of aspects. Each locking service provider 42 needs to be registered with an aspect. The name of the locking service provider 42 is set in SCOL_ASPECT table in LOCKING_PROVIDER field for each aspect. Locking service provider class has two methods that can be called by service manager 16. These are LOCK and UNLOCK. LOCK takes as input a collection of keys representing business objects to be locked, a name of an aspect representing a class of the business objects, and a lock mode. There are various locking modes depending on the locking capability of the target system. Locking mode can specify "E", "S", or "SP". "E" means an exclusive lock or that only one client can obtain the lock. "S" means a shared lock indicating that any clients can lock and no lock exclusive to one client is possible. "SP" means the same as "S" but a subsequent upgrade to an exclusive lock is possible.

LOCK method outputs a Boolean value indicating if the request is rejected or not and also outputs a return code. UNLOCK takes as input a collection of keys representing business objects to be unlocked and a name of an aspect representing a class of the business objects to be unlocked. UNLOCK method also outputs a Boolean value indicating if the request is rejected or not and a return code. A call to UNLOCK is rejected if a transactional buffer is already in a "dirty" state, i.e. if any update, insert, delete operation or an action that is not marked as COL_AFFECTS_NOTHING has been issued since the last CLEANUP call. All locks are removed if the CLEANUP method (described below) of the transaction service provider class is called with reason 'END'.

A transaction is a sequence of information exchange and related work (such as database updating) that is treated as a unit for the purposes of satisfying a request from front end application program 12 to service manager 16 and for ensuring integrity of backend database 24. For a transaction to be completed and changes to database 24 to be made permanent, a transaction has to be completed in its entirety. All of the steps of a transaction are completed before the transaction is successful and the database is actually modified to reflect all of the requested changes. If something happens before the transaction is successfully completed, any changes to the backend database 24 must be kept track of so that the changes can be undone.

To handle transactions, the transaction service provider 40 receives notifications on the various states of a transaction between service manager 16, another non-transaction service provider (e.g., 32, 34, 44, 46), and front end application program 12 (or service manager proxy 14 in some cases). These notifications are the transaction service provider 40's methods BEFORE_SAVE, CLEANUP, and SAVE that are called by the service manager 16 during transactions.

The service manager 16 calls the transaction service provider 40's method BEFORE_SAVE to check if the transactional buffer can be saved. This allows checking if the internal state of the non-transaction service provider is ready for being saved. The method BEFORE_SAVE returns false if it is not possible to save the transactional buffer, then the transaction end is aborted. Thus, the BEFORE_SAVE method has a BOOLEAN return parameter. BEFORE_SAVE takes a Boolean as an input parameter REJECTED. The transactional service provider 16 can prevent the following save and commit operations by setting the REJECTED parameter to a non-initial value, i.e. to "true". The method BEFORE_SAVE is called within the service manager's 16's sequence of operations triggered by the front-end application 12's SAVE method.

The SAVE method finally triggers the application to save the transactional buffer to the database 24. By calling SAVE, all internal states of a non-transaction service provider are made persistent—either by direct updates or by creating appropriate calls to the update task. If all service providers in architecture 38 have received a SAVE request, service manager 16 commits the transaction.

The CLEANUP method tells all non-transaction service providers to release all their transactional buffers and enqueue-based locks. Calling CLEANUP method communicates that all service providers in architecture 38 need to clean up their internal state. CLEANUP takes a REASON string as an input parameter. The REASON field indicates the reason for the clean up operation. This can be either a 'COMMIT' due to a SAVE-operation or the 'END' of the transaction due to the system closing the transaction automatically. There is no guarantee that cleanup is called under failure conditions.

The action service provider 44 is called by service manager 16 to execute an action for an aspect.

The aspect service provider 34 is called by service manager 16 to provide functionality to read and modify the content of one or more aspects. As described previously, an aspect is described by its name (the name is globally unique within a repository), an associated data structure, an associated key (i.e. identifier) structure, a set of implemented actions, a set of outgoing relations, and a set of incoming relations. Aspect service provider 34 has methods EXECUTE, SELECT, INSERT, UPDATE, DELETE, SELECT_BY_RELATION, and UPDATE_FIELDS.

The method EXECUTE is derived from the action service provider 44 and allows executing an action. The method SELECT reads the aspect data associated with the input keys for a given aspect. The SELECT_BY_RELATION method returns, depending on the relation parameter description, either attributes to follow a relation or another aspect, where the source aspect has a relation pointing to that other aspect.

The method INSERT inserts new data into an aspect. INSERT includes as input parameters a table containing the records to be inserted, if aspect is designed for row wise write operations (INRECORDS). The method may allow the inserted record to also define key fields, depending on the aspect description (e.g., a parameter ExternalKeys=true or false). Input parameters also include the name (ASPECT) of the aspect, a set of keys (RELATION_INKEY) for an action acting on a relation, and a name of the relation (RELATION). Method INSERT returns a set of records (OUTRECORDS) representing the inserted records together with their keys and possible other modifications that aspect service provider 34 wants to do on the inserted records. For example one modification can be filling out calculated fields for the set of records. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The UPDATE method updates existing instances of an aspect either record wise or field wise. The input parameters for UPDATE method include a table (INRECORDS) containing the instance keys to be updated, if the aspect is designed for row wise write operations. Input parameters also include the name (ASPECT) of the aspect. Parameters returned by the UPDATE method include the updated records (OUTRECORDS) together with their keys and possible other modifications the service provider wants to do. The order of the OUTRECORDS rows can correspond to the order of the INRECORDS rows. Other output parameters include a Boolean flag (REJECTED) indicating if the request for the SELECT method was rejected or not and return codes (RETURN_CODES).

The DELETE method deletes rows or instances of an aspect in the backend (e.g., backend database 24). Input parameters for DELETE method are a list of keys (INKEYS) encoded within the associated key structure to describe the aspect rows to be deleted and the name (ASPECT) of the aspect. Parameters returned by the DELETE method include a Boolean flag (REJECTED) indicating if the request for the DELETE method was rejected or not and return codes (RETURN_CODES).

The UPDATE_FIELDS method updates fields of instances of an aspect. Input parameters include a list of keys (INRECORDS) encoded within the associated key structure to describe the instances of the aspect to be updated. Input parameters also include a table (INFIELDS) containing pairs of names of fields and corresponding values to be updated within a set of records, if the aspect is designed for field wise write operations. If more than one instance of an aspect is to be updated, the additional field index INKEY points to the associated key record. Input parameters also include the name (ASPECT) of the aspect. Parameters returned by UPDATE_FIELDS include the created or changed instances of the aspect (OUTRECORDS) together with their keys and possible other modifications performed by the aspect service provider 34. The index of the various OUTRECORDS rows have to be associated to the row indexes in the INFIELDS table. Other parameters returned include a Boolean flag (REJECTED) indicating if the request for the UPDATE_FIELDS method was rejected or not and return codes (RETURN_CODES).

The service providers 32, 34, 40, 42, 44, and 46, as described above, enable the following transactional model for the architecture 38. Executing method SELECT of aspect service provider 34 reads from the backend database 24 or reads from a transactional buffer stored in the back-end. Aspect service provider 34 merges data from both sources—the database and its transactional buffer—in a consistent way so that the merge data reflects the updates made so far in this transaction. Next, executing UPDATE, INSERT, UPDATE FIELDS, or DELETE methods of aspect service provider 34 builds up a transactional buffer. Before actually changing data in the transactional buffer, the service manager 16 has to acquire a transactional lock on the data and read the data under the protection of a lock. There are exclusive, shared, and shared promotable lock modes available using locking service provider 42 as described previously. Locking has to be accompanied by selecting the locked data again under the protection of the lock. Applications can support optimistic locking by providing time-stamped or otherwise versioned data, and merging actual and modified data on the front-end in case of conflicts.

The BEFORE_SAVE method of the transaction service provider 40 enables all participating service providers to declare if they are ready for saving the transactional buffer. The SAVE method of the transaction service provider 40 finally triggers service manager 16 to save the transactional buffer to the backend database 24.

The CLEANUP method of the transaction service provider 40 notifies all service providers (e.g., aspect service provider 34) to release all their transactional buffers and enqueue-based locks. If CLEANUP is called with reason 'END', all locks have to be released. If reason is set to 'COMMIT', each service provider can choose to keep its locks. Aspect service provider 34 must not call COMMIT WORK or ROLLBACK WORK internally on its own. The service manager 16 enforces this by automatically aborting the transaction if aspect service provider 34 is trying to commit a transaction.

EXAMPLE

The architecture 38 (of FIG. 3) implements a simple task of creating a new customer, receiving the customer's order of one or more products via GUI 28 and submitting the order to a business process. To support this example, backend database 24 can be implemented using a relational database designed according to the definitions in Tables 1-5 above to define lists of customers, addresses, product types, baskets, positions of products in a basket for each order, and orders. In Tables 6-11, key field headings are denoted with an asterisk. Customers Table 6 defines customers and each customer is uniquely identified by a CustomerId field. Customers Table 6 also includes a NAME field and a foreign key field AddressId that links addresses in an Addresses table to customers.

TABLE 6

| CustomerId* | NAME | AddressId |
|---|---|---|
| 1 | John Smith | 1 |
| 2 | David Klein | 2 |

Customers

Addresses Table 7 defines addresses having a town and a street. The Address id itself is a valid unique key for an address and the connection between address and customer is done through the Customers Table 6 (AddressID field).

TABLE 7

Addresses

| AddressId* | Town | Street |
|---|---|---|
| 1 | Athens | Main Street |
| 2 | Louisville | Willow Avenue |

Table 8 defines products having names with key ProductId.

TABLE 8

Products

| ProductId* | Name |
|---|---|
| 1 | Saw |
| 2 | Hammer |
| 3 | Wrench |
| 4 | Screwdriver |

Table 9 defines shopping baskets having customers with key BasketId.

TABLE 9

Baskets

| BasketId* | CustomerId |
|---|---|
| 1 | 2 |
| 2 | 1 |

Table 10 defines positions of orders in baskets and having products. Positions are dependent on the existence of baskets and orders so the primary key for positions is a combination of PositionId, BasketId, and OrderId.

Table 10. Positions

TABLE 10

Positions

| PositionId* | BasketId* | OrderId* | ProductId |
|---|---|---|---|
| 1 | 1 | 3 | 2 |
| 2 | 1 | 2 | 3 |
| 3 | 2 | 1 | 4 |

Table 11 defines orders having customers and indicating whether or not each order is submitted with primary key OrderId.

TABLE 11

Orders

| OrderId* | CustomerId | Submitted |
|---|---|---|
| 1 | 1 | False |
| 2 | 2 | False |
| 3 | 2 | False |

Figure 5:
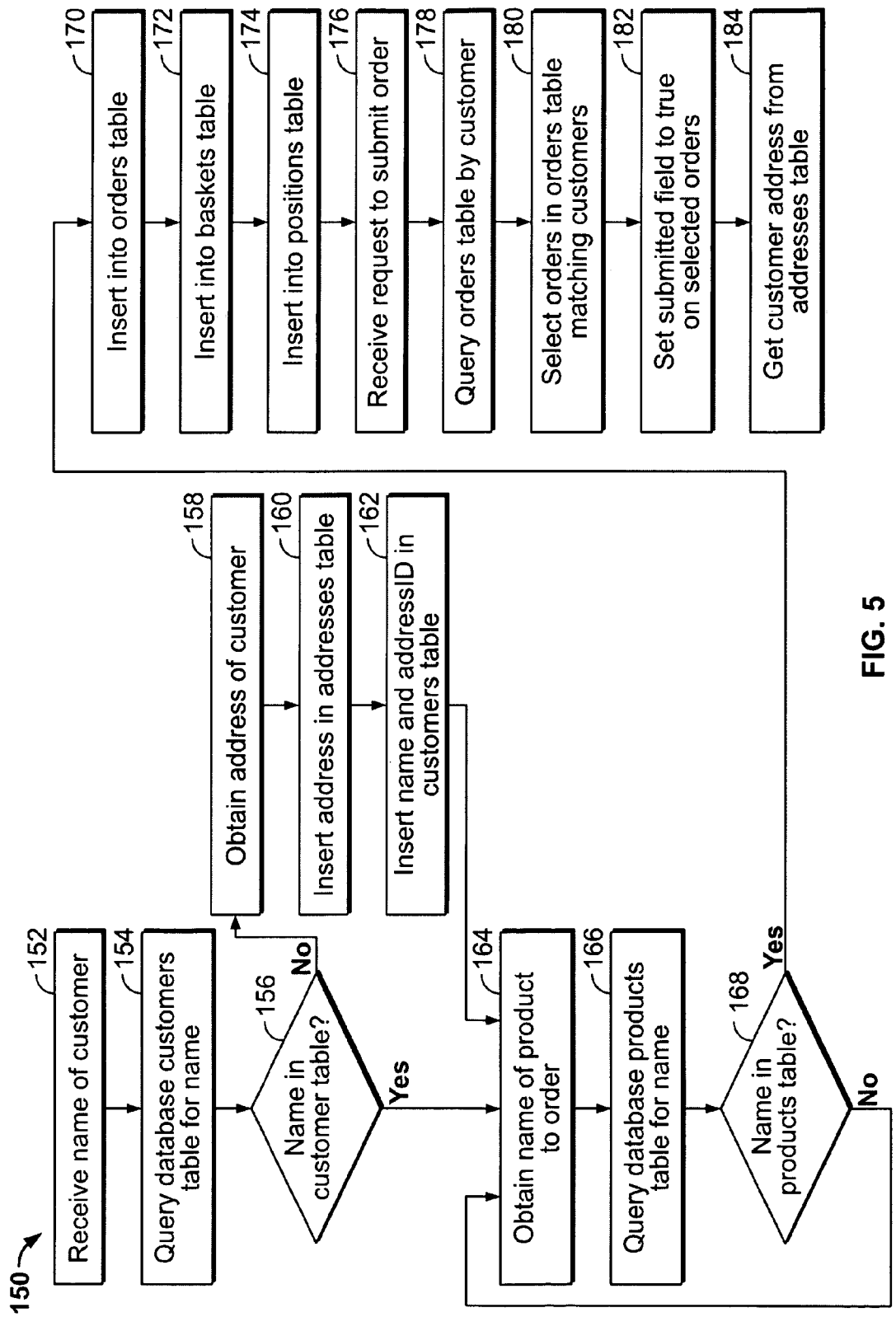
FIG. 5 is a flow diagram of a business process.

As shown in FIG. 5, process 150 defines the database operations on backend database 22 that are needed for this simple task using these tables 6-11. Process 150 includes front end application program 12 receiving (152) a name of a customer. Process 150 includes the business software application querying (154) a database with Customers table (Table 6) for the name in the NAME field. Process 150 includes checking if the customer's name matches (156) a row in the Customers table (Table 6). If no match is made, process 150 includes the business software application obtaining (158) the address of the customer, inserting (160) a new row in the Address table (Table 7) with a new AddressID and address, and inserting (162) a new row in the Customers table (Table 6) with a new CustomerId and the AddressID. If a match is made, process 150 includes the business software obtaining (164) a name of a product to order for the customer. Process 150 includes the business software querying (166) the Products table (Table 8) for the product name.

Process 150 includes checking if the product name matches (168) a row in the Products table (Table 8). If a match is made, then process 150 includes the business software inserting (170) a new order in the Orders table (Table 11) with the customer's CustomerId and setting the Submitted field to "False". Otherwise, process 150 returns to obtaining (164) the name of the product to order. Process 150 includes the business software inserting (172) a new basket in the Basket table (Table 9) with the customer's CustomerId.

Process 150 includes the business software inserting (174) a new position in the Positions table (Table 10) with the CustomerId, BasketId, and ProductId. Process 150 includes the business software receiving (176) a request to submit the order. Process 150 includes the business software querying (178) the Orders table (Table 11) by the customer's CustomerId and this query returns orders matching the customer's CustomerId. Process 150 includes the business software selecting (180) orders in the Orders table (Table 11) matching the orders for the customer's CustomerId. Process 150 includes the business software setting (182) the Submitted field in the selected rows in the Orders table (Table 11) to "True". Process 150 includes the business software getting (184) the address of the customer from the Addresses Table 7 for order delivery by querying Customers Table 6 for an AddressId and then querying Addresses Table 7 for a matching AddressId.

Figure 6:
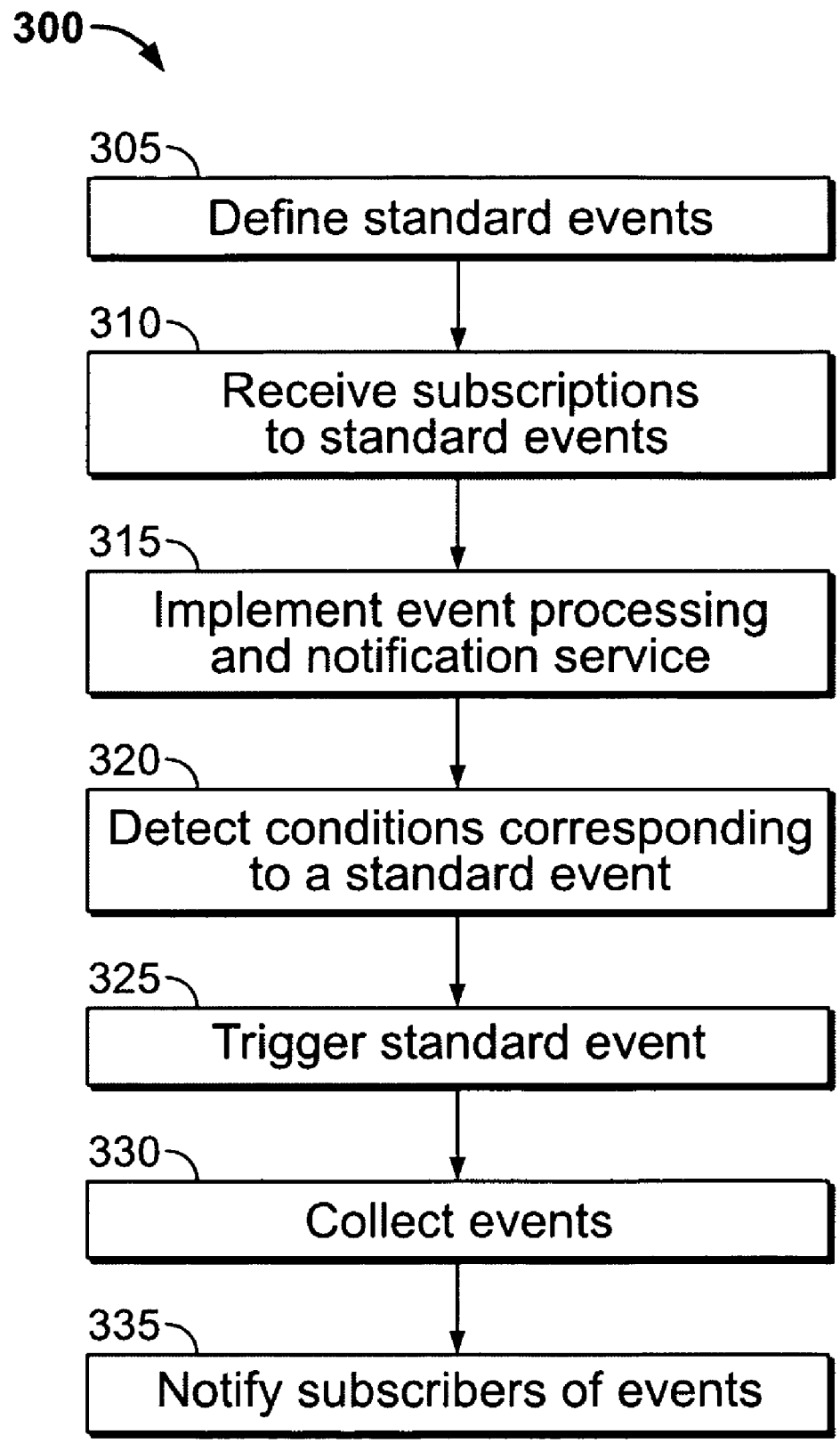
FIG. 6 is a flow diagram of a process for implementing a publish-subscribe mechanism in the enterprise service framework.

The description above describes an example enterprise service framework and an example meta model that the stored meta data in the repository 18 follows. The description also describes a front end application program 12 that uses the enterprise service framework to interact with the back end (e.g., back end database 24), for example, during run time. FIG. 6 is a flow diagram of a process 300 for implementing a publish-subscribe mechanism in the enterprise service framework. A set of standard events for business objects in the back end (e.g., back end database 24) is defined (305) (e.g., in repository 18). As discussed above, the standard events can include insert, update, and delete. In addition, custom events can be defined by service providers 26.

Business objects or other entities subscribe to the standard events (310). In general, the subscriber is actually the code in a subscribing entity that is executed when a standard event is triggered. To implement a subscription, a subscriber registers with the repository 18 in an event registration list. A typical registration list entry includes a business object name, an event name (i.e., one of the standard events or custom events), a subscriber class, an indication of whether the subscription is active, and a notification time. The notification time can indicate batch/asynchronous, synchronous, or synchronous-delayed processing. In batch processing, events are collected and condensed by, for example, accumulating multiple object keys (i.e., uniquely identifying subscribers) for each event associated with a particular business object, and a periodic batch notification is scheduled. In synchronous processing, the subscriber to an event is notified immediately upon triggering the event. In synchronous-delayed processing, the subscriber to an event is notified as soon as possible (e.g., after notifying subscribers with a synchronous subscription). For client-side subscriptions, the front end application program 12 may subscribe through an event listener at the service manager proxy 14.

To notify subscribers in accordance with the subscription, the service manager 16 implements an event service that is defined by meta data stored in the repository 18 (315). The service manager 16 detects operations on business objects in the back end by service providers 26. These operations may be initiated as a result of a request received from a front end application program 12, a service provider 26, or some other entity. When a method for inserting, modifying, or deleting a business object is called (e.g., by executing the INSERT, UPDATE, DELETE, or UPDATE_FIELDS methods), the service manager 16 detects conditions corresponding to the standard event (320) and triggers the corresponding standard event (325). In addition, the service providers 26 can also trigger custom events through an event handler interface. The event service collects and processes events (330) and notifies subscribers of the event (335) as a result of the triggering and using the subscription data stored in the repository 18.

As events are collected, the events are entered in an event list for processing. Processing can include optimizing the list of events. For example, the events on the list can be reordered, deleted, or combined, and the list can be processed in different processes or on different machines for purposes of workload distribution. During monitoring of operations, the event service of the service manager 16 knows whether an event is "committed," "rolled back," or "dirty." A "committed" event is an event that is collected during a transaction that is closed with a COMMIT WORK method. A "rolled back" event is an event that is collected during a transaction that is closed with a ROLLBACK WORK method. "Dirty" events are events that are collected in a transaction that is not yet finished. Processing of events in the list can include removing identical "dirty" events, deleting appropriate "dirty" events when a ROLLBACK WORK method is called, and setting all "dirty" events to a committed state when SAVE method is called by the service manager 16. Processing of events can be controlled by an algorithm that defines a set of rules for how events are to be processed.

The event service can also perform event notifications in accordance with constraints that are defined in the repository 18. The constraints can control when and how events are published. For example, a notification may be sent only if a transaction is committed to the back end database 24 or a notification can be sent regardless of whether a transaction is committed.

The list of events includes columns corresponding to attributes of events, and each row of the list corresponds to an event. The attributes can include an event name, a unique key associated with the business object that generated the event, and an object type for the business object that generated the event. Using the information included in the list of events, event notifications can be dispatched based on criteria specified in the subscriptions that are stored in the repository 18. In particular, the subscriptions can specify criteria for one or more of the attributes (e.g., event name is equal to X and/or unique object key is equal to Y). Accordingly, subscribers can adjust a subscription granularity to broaden or refine the event notifications that are sent to the subscriber.

The techniques described above can be implemented in digital electronic circuitry, or in computer hardware, firmware, software, or in combinations of them. The techniques also can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). The method steps may also be performed in other orders than those described above.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the techniques, or any combination of such back-end, middleware, or front-end components.

The invention has been described in terms of particular embodiments. Other embodiments are within the scope of the following claims.

What is claimed is:

1. A method for providing notifications of events, the method comprising:
defining a set of standard events for objects in a back end system, wherein the objects are presented as rows in tables of a database;
storing subscription information in a repository, the subscription information identifying subscribers based on at least one criterion selected from the group consisting of a name of an event, a unique key for an object, and an object type;
storing data defining publishing constraints in the repository, wherein at least one subscriber is notified only if the publishing constraints are satisfied;
operating on an object in the back end system using an instance of a service provider class;
detecting conditions corresponding to a standard event from the set of standard events, with the conditions corresponding to the standard event defined by meta data stored in the repository; and
notifying at least one subscriber to the standard event, in response to a detected condition and in accordance with a notification method defined in a registration list entry of the subscriber, the notification method comprising batch processing notification, synchronous processing, and synchronous-delayed processing, wherein
the batch processing comprises collecting and condensing events by accumulating multiple object keys for each standard event associated with the object, and scheduling a periodic batch notification,
the synchronous processing comprises immediately notifying the at least one subscriber to the event upon triggering of the event, and
the synchronous-delayed processing comprises notifying the at least one subscriber to the event as soon as possible after notifying subscribers with a synchronous subscription,
wherein the at least one subscriber is notified based on the subscription information.

2. The method of claim 1 further comprising storing data identifying the at least one subscriber in the repository, wherein notifying the at least one subscriber is performed using the data stored in the repository.

3. The method of claim 1 wherein the set of standard events includes at least one standard event selected from the group consisting of modifying a business object, inserting a business object, and deleting a business object.

4. The method of claim 1 wherein the at least one subscriber comprises a client.

5. The method of claim 1 further comprising maintaining a list of standard events for which the corresponding conditions have been detected.

6. The method of claim 5 further comprising processing the list of standard events in accordance with a predetermined algorithm.

7. A system for providing notifications of events, the system comprising:
a repository comprising meta data representing business objects in a back end system, definitions of conditions corresponding to events, and registrations of event subscribers, wherein the business objects are presented as rows in tables of a database; and
an enterprise service framework in communication with the repository, wherein the enterprise service framework comprises:
logic for maintaining a list of events, each event including attributes selected from the group consisting of an event name, a unique key associated with the business object associated with the event, and an object type for the business object associated with the event;
a detector for detecting an operation on a business object in the back end system by an instance of a service provider class;
logic for determining whether the operation satisfies the defined conditions in the repository corresponding to a particular event;
logic for triggering the particular event if the operation satisfies the defined conditions corresponding to the particular event;
logic for processing the list of events prior to notifying the at least one subscriber in accordance with predetermined rules stored in the repository; and
logic for notifying at least one event subscriber registered to receive a notification of the particular event, based on the registrations in the repository and in accordance with a notification method defined in a registration list entry of the subscriber, the notification method comprising batch processing notification, synchronous processing, and synchronous-delayed processing, wherein
the batch processing comprises collecting and condensing events by accumulating multiple object keys for each standard event associated with the object, and scheduling a periodic batch notification,
the synchronous processing comprises immediately notifying the at least one subscriber to the event upon triggering of the event, and
the synchronous-delayed processing comprises notifying the at least one subscriber to the event as soon as possible after notifying subscribers with a synchronous subscription.

8. The system of claim 7 wherein the enterprise service framework further comprises:
a receiver for receiving requests from clients; and
logic for initiating operations by instances of service provider classes in response to the requests.

9. The system of claim 7 wherein the event subscribers comprise at least one of clients or instances of service provider classes.

10. The system of claim 7 wherein the conditions corresponding to events define standard events and the enterprise service framework further comprises a receiver for receiving notifications of custom events defined for a service provider class.

11. The system of claim 7 wherein the registrations of event subscribers define event subscriptions based on attributes of the events.

12. A computer program product, stored on a machine-readable storage medium, for providing notifications of events, the computer program product comprising executable instructions that cause a computer to:
retrieve a stored set of standards events for objects in a back end system, wherein the objects are presented as rows in tables of a database;
store subscription information in a repository, the subscription information identifying subscribers based on at least one criterion selected from the group consisting of a name of an event, a unique key for an object, and an object type;

store data defining publishing constraints in the repository, wherein at least one subscriber is notified only if the publishing constraints are satisfied;

operate on an object in the back end system using an instance of a service provider class;

detect conditions corresponding to a standard event from the set of standard events, with the conditions corresponding to the standard event defined by meta data stored in the repository; and notify at least one subscriber to the standard event, in response to the detected conditions and in accordance with a notification method defined in a registration list entry of the subscriber, the notification comprising batch processing notification, synchronous processing, and synchronous-delayed processing, wherein the batch processing comprises collecting and condensing events by accumulating multiple object keys for each standard event associated with the object, and scheduling a periodic batch notification, the synchronous processing comprises immediately notifying the at least one subscriber to the event upon triggering of the event, and the synchronous-delayed processing comprises notifying the at least one subscriber to the event as soon as possible after notifying subscribers with a synchronous subscription, wherein the at least one subscriber is notified based on the subscription information.

13. The computer program product of claim 12, wherein the computer program product further comprises executable instructions that cause a computer to store data identifying the at least one subscriber in the repository, wherein notifying the at least one subscriber is performed using the data stored in the repository.

14. The computer program product of claim 12 wherein the computer program product further comprises executable instructions that cause a computer to maintain a list of standard events for which the corresponding conditions have been detected.

\* \* \* \* \*